(12) United States Patent
Hirokawa (10) Patent No.: US 11,734,950 B2
(45) Date of Patent: Aug. 22, 2023

(54) FINGERPRINT MATCHING APPARATUS, FINGERPRINT MATCHING METHOD, AND RECORDING MEDIUM (71) Applicant: NEC Corporation, Tokyo (JP)

(72) Inventor: Akira Hirokawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/910,855

(22) PCT Filed: Mar. 30, 2020

(86) PCT No.: PCT/JP2020/014507
§ 371 (c)(1),
(2) Date: Sep. 12, 2022

(87) PCT Pub. No.: WO2021/199136
PCT Pub. Date: Oct. 7, 2021

(65) Prior Publication Data
US 2023/0097156 A1 Mar. 30, 2023

(51) Int. Cl.
*G06V 40/12* (2022.01)
*G06V 10/75* (2022.01)
(Continued)

(52) U.S. Cl.
CPC ........ *G06V 40/1376* (2022.01); *G06V 10/751* (2022.01); *G06V 40/1335* (2022.01);
(Continued)

(58) Field of Classification Search
CPC ........... G06V 40/1376; G06V 40/1359; G06V 40/63; G06V 10/751; G06V 40/50; G06V 40/1335
See application file for complete search history.

(56) References Cited

U.S. PATENT DOCUMENTS 6,785,408 B1 * 8/2004 Setlak ................ G06V 40/1359
382/125
2003/0103659 A1 6/2003 Hara et al.
(Continued)

FOREIGN PATENT DOCUMENTS

JP 2002-279427 A 9/2002
JP 2003-173445 A 6/2003
(Continued)

OTHER PUBLICATIONS

International Search Report for PCT Application No. PCT/JP2020/014507, dated Jun. 30, 2020.

*Primary Examiner* — Lixi C Simpson
(74) *Attorney, Agent, or Firm* — Sughrue Mion, PLLC (57) ABSTRACT A fingerprint image display means displays an input fingerprint image being a fingerprint image which is input and a registered fingerprint image being a fingerprint image which has been registered. A marker acquisition means acquires a position of an input marker which is input by a user with respect to the input fingerprint image being displayed. A marker applying means applies a correspondence marker at a position corresponding to an input marker in the registered fingerprint image. A matching means matches the input fingerprint image to which the input marker is input with the registered fingerprint image to which the correspondence marker has been applied.

10 Claims, 6 Drawing Sheets (51) Int. Cl.
  *G06V 40/50* (2022.01)
  *G06V 40/60* (2022.01)
(52) U.S. Cl.
  CPC .......... *G06V 40/1359* (2022.01); *G06V 40/50* (2022.01); *G06V 40/63* (2022.01)

(56) References Cited

U.S. PATENT DOCUMENTS

| | | | | |
|---|---|---|---|---|
| 2005/0223236 | A1* | 10/2005 | Yamada | G06V 40/12 713/186 |
| 2012/0195475 | A1* | 8/2012 | Abiko | G06V 10/987 382/115 |
| 2017/0046550 | A1* | 2/2017 | Lee | G06V 40/1376 |
| 2020/0057910 | A1 | 2/2020 | Aoki | |

FOREIGN PATENT DOCUMENTS

| | | | |
|---|---|---|---|
| WO | 2017/038695 | A1 | 3/2017 |
| WO | 2018/198500 | A1 | 12/2017 |

\* cited by examiner

FIG. 4A

\<INITIAL CANDIDATE LIST\>

| (INPUT FINGERPRINT ID) | (REGISTERED FINGERPRINT ID) | (SCORE) |
|---|---|---|
| s000a127.NBTC.bt5s | f000a127.NBTC.bt5s | 279 |
| s000a127.NBTC.bt5s | f0040401.NBTC.bt5s | 232 |
| s000a127.NBTC.bt5s | f0092051.NBTC.bt5s | 173 |
| s000a127.NBTC.bt5s | f0080651.NBTC.bt5s | 173 |
| s000a127.NBTC.bt5s | f0034931.NBTC.bt5s | 162 |
| s000a127.NBTC.bt5s | f0021301.NBTC.bt5s | 151 |
| s000a127.NBTC.bt5s | f000d165.NBTC.bt5s | 145 |
| s000a127.NBTC.bt5s | f0035781.NBTC.bt5s | 136 |
| s000a127.NBTC.bt5s | f0084301.NBTC.bt5s | 123 |
| s000a127.NBTC.bt5s | f0071121.NBTC.bt5s | 123 |

FIG. 4B

\<CANDIDATE LIST AFTER UPDATED\>

| (INPUT FINGERPRINT ID) | (REGISTERED FINGERPRINT ID) | (SCORE) | |
|---|---|---|---|
| s000a127.NBTC.bt5s | f0040401.NBTC.bt5s | 286 | ← |
| s000a127.NBTC.bt5s | f000a127.NBTC.bt5s | 264 | ← INTERCHANGE |
| s000a127.NBTC.bt5s | f0092051.NBTC.bt5s | 163 | |
| s000a127.NBTC.bt5s | f0080651.NBTC.bt5s | 153 | |
| s000a127.NBTC.bt5s | f0034931.NBTC.bt5s | 151 | |
| s000a127.NBTC.bt5s | f0021301.NBTC.bt5s | 143 | |
| s000a127.NBTC.bt5s | f000d165.NBTC.bt5s | 133 | |
| s000a127.NBTC.bt5s | f0035781.NBTC.bt5s | 132 | |
| s000a127.NBTC.bt5s | f0084301.NBTC.bt5s | 125 | |
| s000a127.NBTC.bt5s | f0071121.NBTC.bt5s | 121 | |

FINGERPRINT MATCHING APPARATUS, FINGERPRINT MATCHING METHOD, AND RECORDING MEDIUM

This application is a National Stage Entry of PCT/JP2020/014507 filed on Mar. 30, 2020, the contents of all of which are incorporated herein by reference, in their entirety.

TECHNICAL FIELD

The present disclosure relates to matching of fingerprint images.

BACKGROUND ART

Fingerprint authentication is known as one method of biometric authentication. In the fingerprint authentication, a fingerprint image of a specific person and data of feature points extracted from the fingerprint image are stored in a fingerprint database. In a case of matching the fingerprints, feature points are extracted from a subject fingerprint image, and it is determined whether or not a subject person matches a specific person based on a degree of similarity with feature points of each of fingerprints registered in the fingerprint database. Patent Document 1 describes a method that each area of a region where no feature point exists in a fingerprint image is extracted as a skeleton stability, and is used for matching of fingerprints.

PRECEDING TECHNICAL REFERENCES

Patent Document

Patent Document 1: Japanese Laid-open Patent Publication No. 2003-173445

SUMMARY

Problem to be Solved by the Invention

A large amount of fingerprint data is stored in a fingerprint database intended for criminal investigation. In a case of a criminal device, a forensic examiner matches a retained fingerprint with fingerprints registered in the fingerprint database (hereinafter referred to as "registered fingerprints"); however, since the number of registered fingerprints to be matched is enormous, it is necessary to reduce the number of the registered fingerprints to be matched by the forensic examiner.

It is one object of the present disclosure to provide a fingerprint matching apparatus capable of appropriately reducing the number of registered fingerprints to be matched in a fingerprint authentication.

Means for Solving the Problem

According to an example aspect of the present disclosure, there is provided a fingerprint matching apparatus including:
a fingerprint image display means for displaying an input fingerprint image being a fingerprint image which is input and a registered fingerprint image being a fingerprint image which has been registered;
a marker acquisition means for acquiring a position of an input marker which is input by a user with respect to the input fingerprint image being displayed;
a marker applying means for applying a correspondence marker at a position corresponding to the input marker, in the registered fingerprint image; and
a matching means for matching the input fingerprint image to which the input marker is input, with the registered fingerprint image to which the correspondence marker has been applied.

According to another example aspect of the present disclosure, there is provided a fingerprint matching method, including:
displaying an input fingerprint image being a fingerprint image which is input and a registered fingerprint image being a fingerprint image which has been registered;
acquiring a position of an input marker which is input by a user with respect to the input fingerprint image being displayed;
applying a correspondence marker at a position corresponding to the input marker, in the registered fingerprint image; and
matching the input fingerprint image to which the input marker is input, with the registered fingerprint image to which the correspondence marker has been applied.

According to still another example aspect of the present disclosure, there is provided a recording medium storing a program, the program causing a computer to perform a process including:
displaying an input fingerprint image being a fingerprint image which is input and a registered fingerprint image being a fingerprint image which has been registered;
acquiring a position of an input marker which is input by a user with respect to the input fingerprint image being displayed;
applying a correspondence marker at a position corresponding to the input marker, in the registered fingerprint image; and
matching the input fingerprint image to which the input marker is input, with the registered fingerprint image to which the correspondence marker has been applied.

Effect of the Invention

According to the present disclosure, it becomes possible to appropriately reduce the number of registered fingerprints to be matched in a fingerprint authentication.

EXAMPLE EMBODIMENTS

In the following, example embodiments will be described with reference to the accompanying drawings.

<First Example Embodiment>

[Fingerprint Matching Apparatus]

Figure 1:
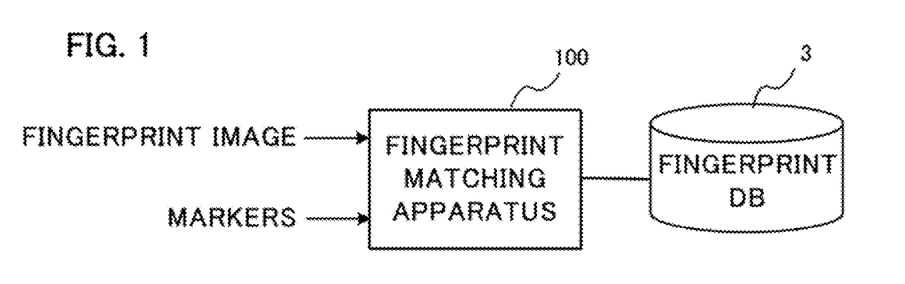
FIG. 1 illustrates an outline of a fingerprint matching apparatus according to a first example embodiment.

FIG. 1 illustrates an outline of a fingerprint matching apparatus according to a first example embodiment of the present disclosure. A fingerprint image is input to a fingerprint matching apparatus 100. The fingerprint image to be input (hereinafter, referred to as an "input fingerprint image") is an image of a fingerprint that is used to identify a person, such as a retained fingerprint in a criminal investigation or a fingerprint input for a personal authentication, for instance. The fingerprint matching apparatus 100 is connected to a fingerprint database (DB) 3. The fingerprint DB 3 stores sets of fingerprint data for a plurality of persons. The fingerprints stored in the fingerprint DB 3 are referred to as "registered fingerprints," and images of the registered fingerprints are referred to as "registered fingerprint images". The fingerprint data includes identification information (ID) for identifying the fingerprint data, a fingerprint image, and feature point data indicating feature points extracted from the fingerprint image. The fingerprint data may include information concerning an owner of the fingerprint. The fingerprint matching apparatus 100 matches a fingerprint being input (hereinafter, referred to as "input fingerprint") with a plurality of registered fingerprints recorded in the fingerprint DB 3 to specify the owner of the input fingerprint.

In the present example embodiment, a marker is input to the fingerprint matching apparatus 100 by a user such as a forensic examiner. As will be described in more detail below, the user inputs the marker at a distinctive position in the input fingerprint image. The fingerprint matching apparatus 100 calculates scores indicating degrees of similarity (degrees of matching) between the input fingerprint and the registered fingerprints using the marker input by the user, and reduces the number of the registered fingerprints based on the calculated scores.

[Hardware Configuration]

Figure 2:
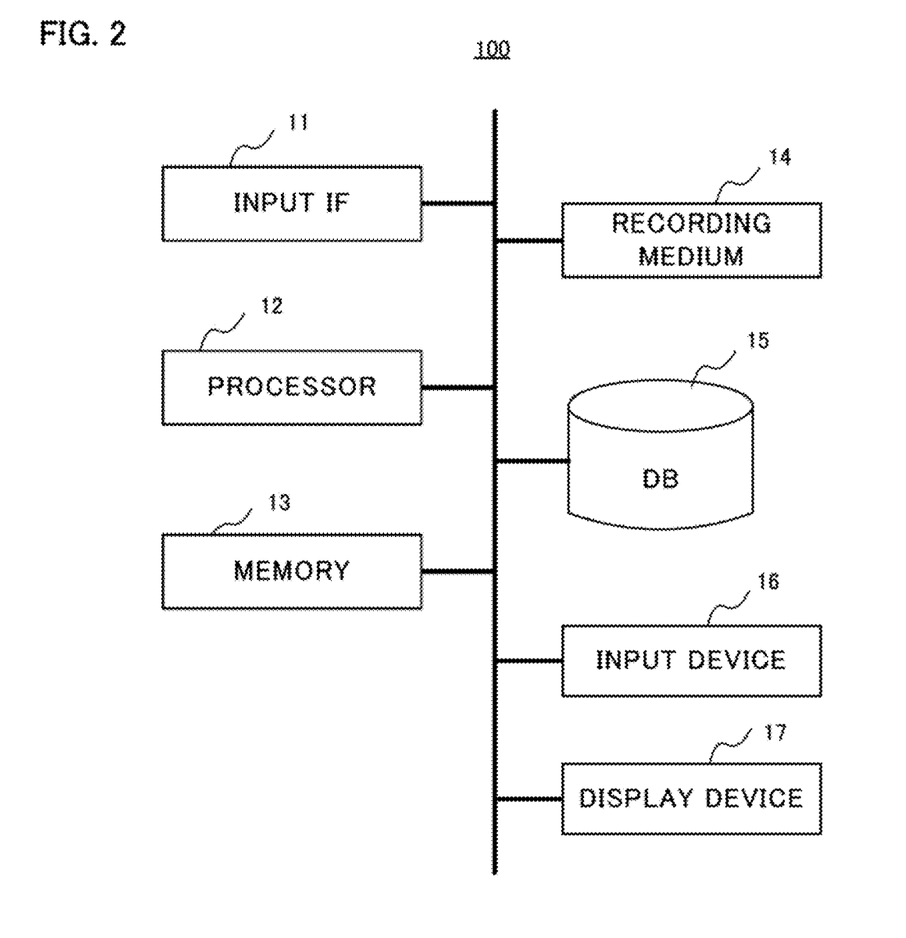
FIG. 2 is a block diagram illustrating a hardware configuration of the fingerprint matching apparatus.

FIG. 2 is a block diagram illustrating a hardware configuration of a fingerprint matching apparatus 100. As illustrated, the fingerprint matching apparatus 100 includes an input IF (InterFace) 11, a processor 12, a memory 13, a recording medium 14, a database (DB) 15, an input device 16, and a display device 17.

The input IF 11 inputs and outputs data. Specifically, the input IF 11 acquires the input fingerprint image and the fingerprint data of the registered fingerprint from the fingerprint DB 3.

The processor 12 is a computer such as a CPU (Central Processing Unit), a GPU (Graphics Processing Unit), or the like, and controls the entire fingerprint matching apparatus 100 by executing programs prepared in advance. In particular, the processor 12 performs a fingerprint matching process which will be described later.

The memory 13 is formed by a ROM (Read Only Memory), a RAM (Random Access Memory), or the like. The memory 13 stores various programs to be executed by the processor 12. The memory 13 is also used as a working memory during executions of various processes by the processor 12.

The recording medium 14 is a non-volatile and non-transitory recording medium such as a disk-shaped recording medium, a semiconductor memory, or the like, and is formed to be detachable from the fingerprint matching apparatus 100. The recording medium 14 records various programs executed by the processor 12.

The DB 15 stores fingerprint images of fingerprints input from the input IF 11. Moreover, the fingerprint data of the registered fingerprint, which is read from the fingerprint DB 3 in response to an execution of the fingerprint matching process, is temporarily stored in the DB 15.

The input device 16 is, for instance, a keyboard, a mouse, a touch panel, or the like, and is used for the user to carry out instructions and inputs necessary in connection with processes by the fingerprint matching apparatus 100. In particular, the input device 16 is used by the user to input a marker to an input fingerprint image, as will be described below. The display device 17 is, for instance, a liquid crystal display, and displays a fingerprint display screen for displaying the input fingerprint image and the registered fingerprint image side by side, a candidate list for displaying registered fingerprints in an order of scores indicating each degree of similarity between the input fingerprint and a plurality of registered fingerprints, and the like.

[Functional Configuration]

Figure 3:
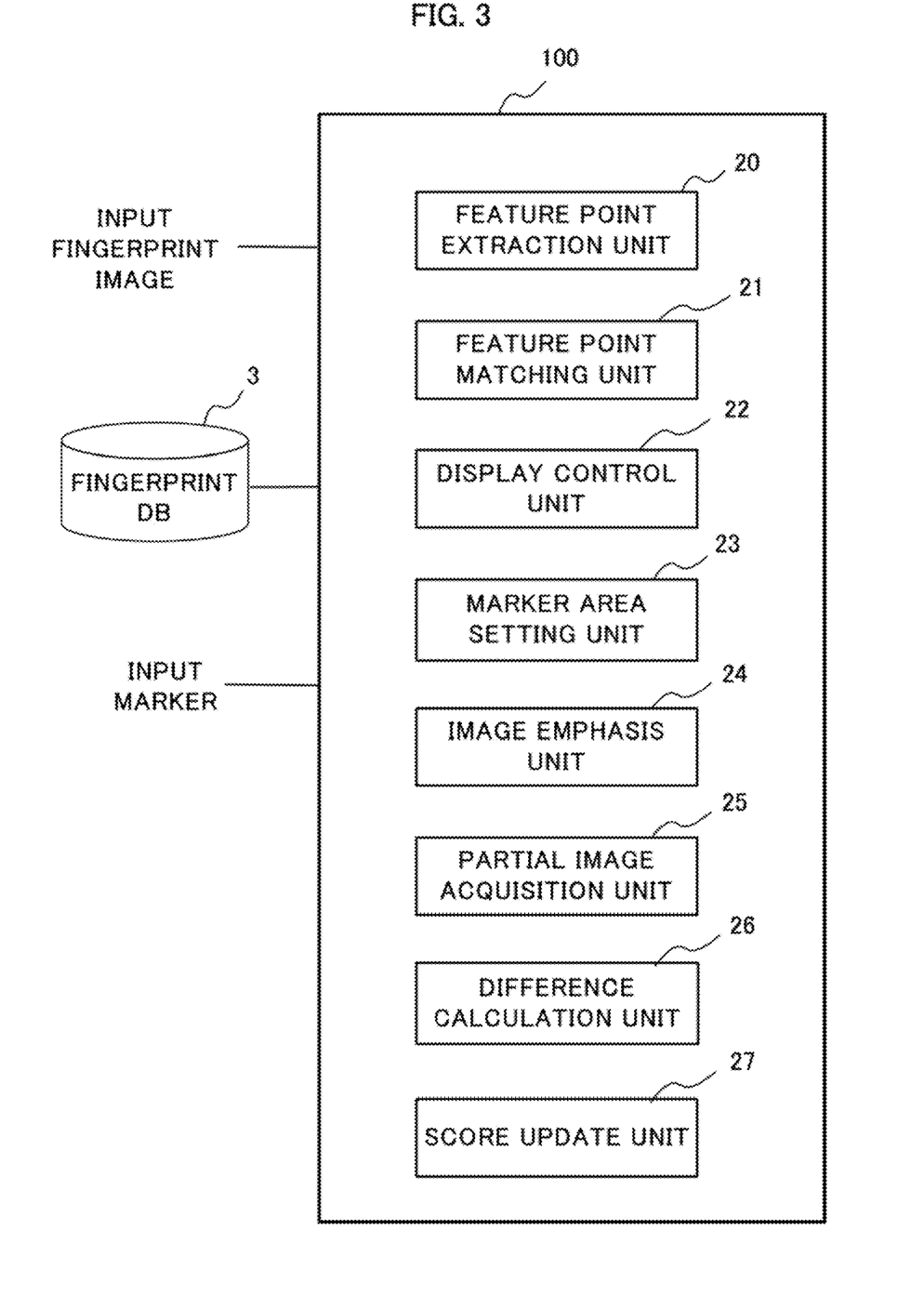
FIG. 3 is a block diagram illustrating a functional configuration of the fingerprint matching apparatus.

FIG. 3 is a block diagram illustrating a functional configuration of the fingerprint matching apparatus 100. The fingerprint matching apparatus 100 includes a feature point extraction unit 20, a feature point matching unit 21, a display control unit 22, a marker area setting unit 23, an image emphasis unit 24, a partial image acquisition unit 25, a difference calculation unit 26, and a score update unit 27.

The feature point extraction unit 20 extracts feature points from the input fingerprint image and generates feature point data. The feature point data include information of positions and directions of the feature points such as end points, branch points, and the like of fingerprint ridges in the input fingerprint image or skeleton lines by thinned ridges. Moreover, the feature point extraction unit 20 acquires the feature point data of each registered fingerprint image from the fingerprint DB 3. Next, the feature point extraction unit 20 performs a feature point matching between the input fingerprint image and the registered fingerprint image to extract a pair of feature points, and calculates the score indicating the degree of similarity (or the degree of matching) between the input fingerprint image and the registered fingerprint image. Specifically, the feature point extraction unit 20 determines the degree of similarity between respective feature points of the input fingerprint image and respective feature points of the registered fingerprint image, and extracts the pair of feature points. The "pair of feature points" is regarded as a pair of feature points which degree of similarity is determined to be equal to or greater than a predetermined value. The feature point data may include information of the number of ridges crossing between the two feature points, which is referred to as a relationship. The feature point extraction unit 20 outputs the feature point data of the input fingerprint image and the feature point data of the plurality of the registered fingerprint images to the feature point matching unit 21. The feature point extraction unit 20 corresponds to an example of a feature point extraction means.

The feature point matching unit 21 calculates a score indicating the degree of similarity (or the degree of matching) between the input fingerprint image and the registered fingerprint image based on the feature point data of the input fingerprint image and the feature point data of the registered fingerprint image. Specifically, the feature point matching unit 21 calculates the similarity degree for each pair of feature points using the feature point data of the input fingerprint image and the feature point data of the registered fingerprint image, and comprehensively calculates the score indicating the degree of similarity. Thus, the feature point matching unit 21 calculates respective scores of a plurality of registered fingerprints stored in the fingerprint DB 3 with respect to the input fingerprint image, and extracts a plurality of registered fingerprints which scores are equal to or higher than a predetermined threshold. After that, the feature point matching unit 21 creates a candidate list, in which the plurality of registered fingerprints that are extracted are arranged in descending order of scores of the degree of similarity, and outputs the candidate list to the display control unit 22. The candidate list thus generated by the feature point matching unit 21 is also referred to as an "initial candidate list". Note that in response to an instruction by the user, the display control unit 22 displays the initial candidate list on the display device 17. The feature point matching unit 21 corresponds to examples of a matching means and a list creation means.

Figure 4A:
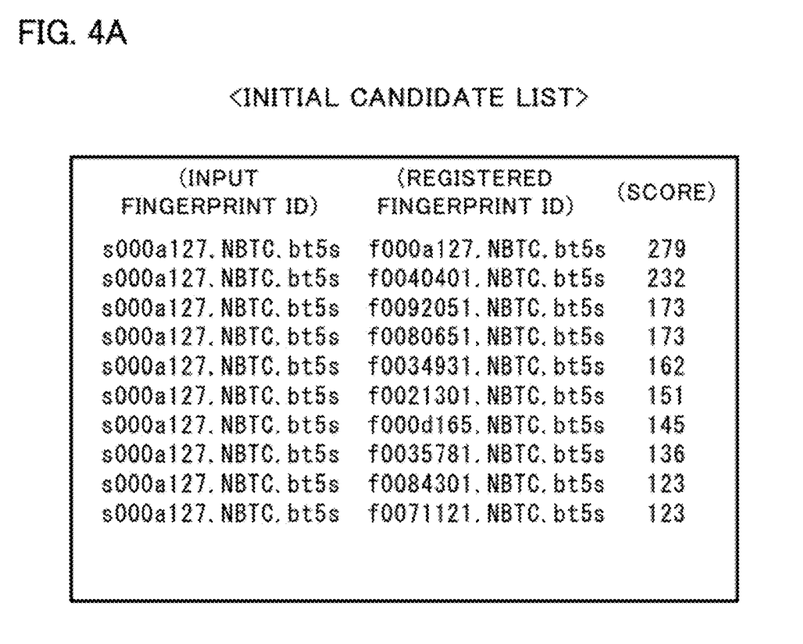
FIG. 4 illustrates an example of a candidate list of a registered fingerprint image.

FIG. 4A illustrates an example of the initial candidate list generated by the feature point matching unit 21. The "input fingerprint ID" corresponds to the identification information (ID) of the input fingerprint image, and indicates an ID of one input fingerprint image to be matched in this example. The "registered fingerprint ID" indicates each ID for a plurality of sets of registered fingerprint data stored in the fingerprint DB 3. As described above, the "score" is regarded as a score indicating the degree of similarity which the feature point matching unit 21 calculates based on the feature point data extracted from the input fingerprint image and the feature point data for each of the registered fingerprint images stored in the fingerprint DB 3, and which indicates that the greater the value is, the higher the degree of similarity is. In the initial candidate list, a plurality of registered fingerprint IDs are displayed in an order of higher matching score for the input fingerprint to be matched.

Figure 5:
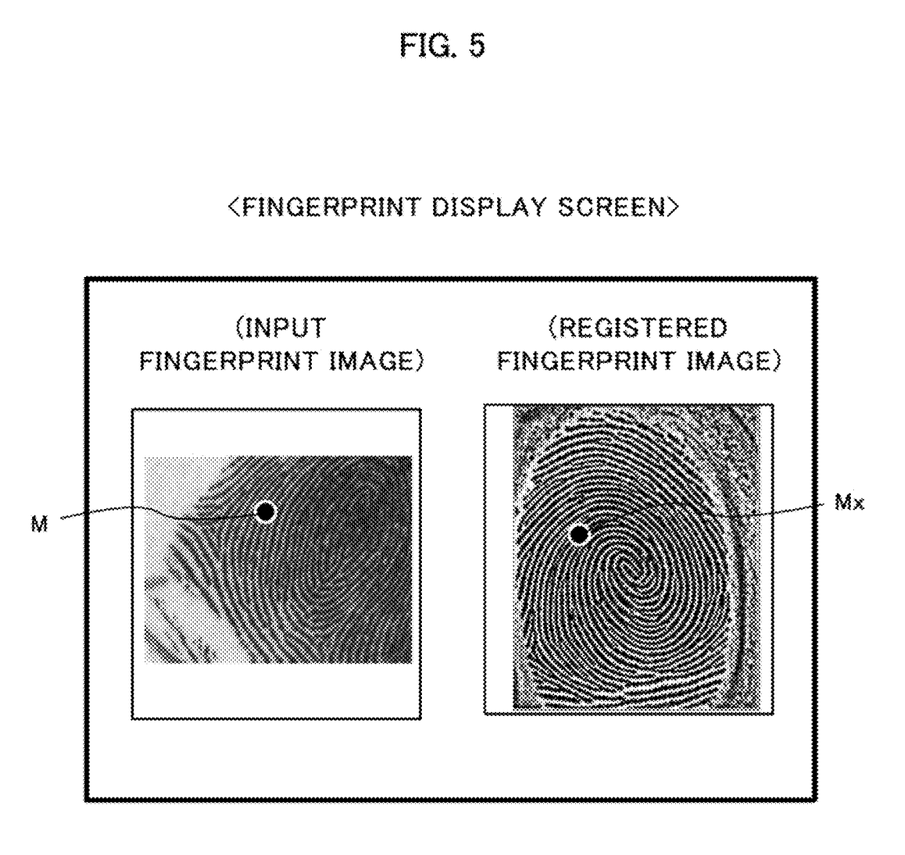
FIG. 5 illustrates an example of a fingerprint display screen.

Moreover, the display control unit 22 displays a fingerprint display screen that displays the input fingerprint image and the registered fingerprint image in comparison. FIG. 5 illustrates an example of the fingerprint display screen. The fingerprint display screen is displayed on the display device 17, and includes the input fingerprint image and the registered fingerprint image. Note that the registered fingerprint image is one of the plurality of registered fingerprint images used for matching with the input fingerprint image. Initially, the registered fingerprint image having a maximum score in the initial candidate list illustrated in FIG. 4A is displayed, but in response to a selection of the user, it is also possible to display the registered fingerprint images with a second and lower scores in the initial candidate list. The display control unit 22 corresponds to an example of a fingerprint image display means.

The user observes the input fingerprint image displayed on the fingerprint display screen, and inputs a marker at a portion which is determined to greatly characterize the input fingerprint, that is, at a characteristic and unique portion of the input fingerprint. The "marker" is regarded as a mark which the user designates a position on the input fingerprint image. Note that the shape of the marker may be a round or a rectangle as well as a point or a circle that encloses a portion in an area, and the shape is not particularly limited thereto. For instance, the user operates the input device 16 such as a mouse, and inputs a marker M on the input fingerprint image as illustrated in FIG. 5. The marker M input by the user on the input fingerprint image is also referred to as a "user input marker M".

When the marker M is applied by the user, the marker area setting unit 23 sets a marker area (hereinafter, also referred to as a "user input marker area") based on the position where the marker M is applied in the input fingerprint image. The marker area setting unit 23 determines a predetermined area centered on a position where the marker M is applied, for instance, a rectangular area with a predetermined size as the user input marker area. Note that the shape of the user input marker area can be arbitrarily set, and may be a circle, an ellipse, a polygon, or the like as well as a rectangle.

Moreover, as illustrated in FIG. 5, the marker area setting unit 23 automatically applies the marker Mx at a position on the registered fingerprint image, which corresponds to the position where the marker M is applied on the input fingerprint image. Note that the marker Mx automatically, which is applied on the registered fingerprint image by the marker area setting unit 23, is hereinafter also referred to as an "automatic correspondence marker". Furthermore, the marker area setting unit 23 sets a marker area (hereinafter, also referred to as an "automatic correspondence marker area.) based on the position of the marker Mx. The marker area setting unit 23 determines a predetermined area centered on a position where the marker Mx is applied, for instance, a rectangular area with the same size as that of the user input marker area, as the automatic correspondence marker area. Accordingly, it is possible for the user to set the marker area with the same size as that of the marker M input by the user on the registered fingerprint image.

As described above, each pair of feature points in the input fingerprint image and the registered fingerprint image has already been specified by the feature point extraction unit 20. Accordingly, when the marker M is input to the input fingerprint image, the marker area setting unit 23 acquires a positional relationship between a position where the marker M is input in the input fingerprint image and a plurality of feature points present in a periphery of the marker M (referred to as "peripheral feature points"). Next, the marker area setting unit 23 detects an area in which a plurality of feature points exist with the same positional relationship as that of the plurality of peripheral feature points described above in the registered fingerprint image. After that, the marker area setting unit 23 automatically applies the marker Mx to the detected area, so that a positional relationship between the marker Mx and a plurality of feature points in a periphery of the detected area becomes similar to a positional relationship between the marker M and the peripheral feature points in the input fingerprint image. By this manner, the marker Mx is applied to a position correctly corresponding to the marker M. Note that since the marker area setting unit 23 applies the marker Mx using the positional relationship between the marker M and the peripheral feature points, even in a case where the position of the marker M input by the user is not a position of the feature point extracted from an original input fingerprint image, it is possible to apply the marker Mx at a position corresponding to the marker M.

The marker area setting unit 23 applies the marker Mx for each of the plurality of registered fingerprint images, and sets the automatic correspondence marker area. This makes it possible to update scores with respect to the plurality of registered fingerprint images. However, the marker area setting unit 23 may apply the marker Mx only for a predetermined number of registered fingerprint images having top scores, rather than all registered fingerprint images which scores are calculated by the feature point matching unit 21. The marker area setting unit 23 corresponds to examples of a marker acquisition means and a marker applying means.

The image emphasis unit 24 performs an image emphasis with respect to the input fingerprint image and the registered fingerprint images. The image emphasis is to normalize pixel values of the input fingerprint image and the registered fingerprint images as a preprocess for later calculating respective differences between the input fingerprint image and the registered fingerprint images. For instance, in the input fingerprint image and the registered fingerprint images, the image emphasis unit 24 converts the pixel values so that a maximum luminance value attains to "255" and a minimum luminance value attains to "0" for each local area with a predetermined size (for instance, 16×16 pixels).

The partial image acquisition unit 25 calculates a difference of the pixel values between the input fingerprint image and the registered fingerprint image in the area set by the marker area setting unit 23. In detail, the partial image acquisition unit 25 cuts out a partial image of the user input marker area (hereinafter, referred to as an "input fingerprint partial image") in the input fingerprint image after the image emphasis. Moreover, the partial image acquisition unit 25 cuts out a partial image of the automatic correspondence marker area (hereinafter, referred to as a "registered fingerprint partial image") in the registered fingerprint image after the image emphasis. At this time, the partial image acquisition unit 25 determines a range of the registered fingerprint partial image so that directions and positional relationships of feature points included in the input fingerprint partial image match with those of feature points included in the registered fingerprint portion image. Specifically, the partial image acquisition unit 25 adjusts an angle by rotating the registered fingerprint image as necessary so that the positional relationship of the plurality of feature points in the registered fingerprint portion image matches with the positional relationship of the corresponding plurality of feature points in the input fingerprint portion image, and cuts out the registered fingerprint partial image. The partial image acquisition unit 25 corresponds to an example of a partial image acquisition means.

The difference calculation unit 26 obtains a difference between the input fingerprint partial image and the registered fingerprint partial image which are acquired by the partial image acquisition unit. In detail, the partial image acquisition unit 25 calculates a difference value between these two images while shifting a relative position of the input fingerprint partial image and the registered fingerprint partial image in a horizontal direction and a vertical direction, and determines the relative position at which the acquired difference value becomes a minimum. Next, the difference calculation unit 26 outputs a total of difference values of respective pixels between the input fingerprint partial image and the registered fingerprint partial image at the relative position to the score update unit 27, as a difference value between these two images. In this manner, it is possible to calculate the difference value in a state in which the input fingerprint image and the registered fingerprint image are correctly arranged.

The score update unit 27 updates the score indicating the degree of similarity between the input fingerprint image and the registered fingerprint image using the input difference value. For instance, when the difference value between the input fingerprint partial image and the registered fingerprint partial image is denoted by V, the score update unit 27 updates the score in accordance with the following equation.

(Post-update score)=(Pre-update score)−(V−A)/B

Here, "A" and "B" denote constants, respectively. Since a difference value V calculated by the partial image acquisition unit 25 becomes a larger value as the difference between the input fingerprint image and the registered fingerprint image increases, the post-update score obtained by the above equation becomes a smaller value as the difference between the input fingerprint image and the registered fingerprint image increases. By using the difference value, a computational load required for updating the score can be reduced.

Note that when the user inputs the marker M at a first time, the score update unit 27 updates an initial score calculated by the feature point matching unit 21. Moreover, when the user inputs the marker M at a second time or later, the score update unit 27 further updates the post-update score, which has been updated based on an input of a previous marker M, based on an input of a current marker M.

Figure 4B:
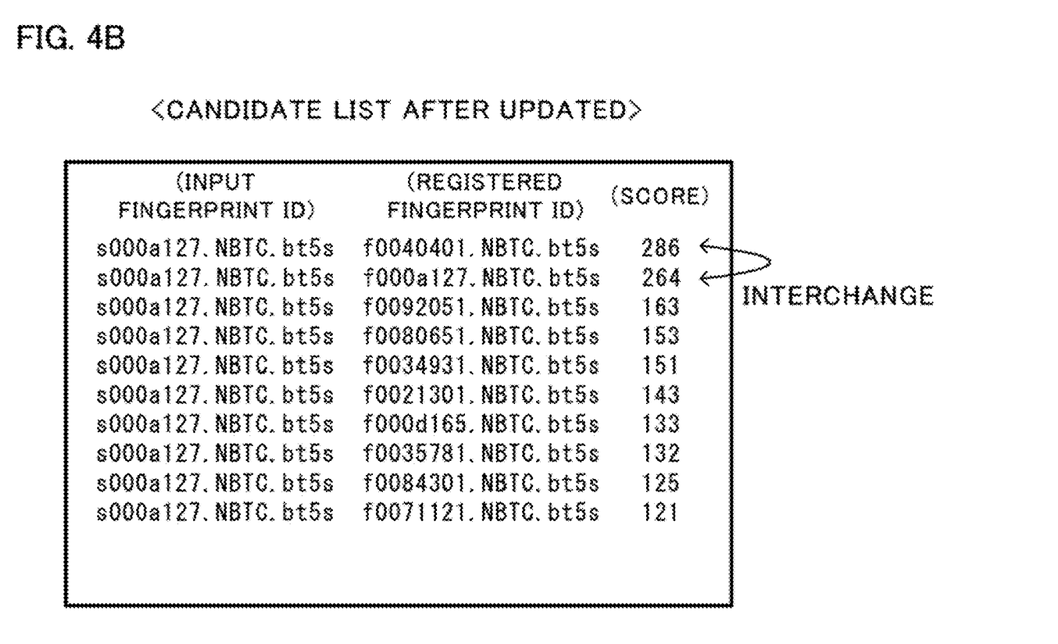

The score update unit 27 calculates the post-update scores for all the registered fingerprint images included in the candidate list at a present time, and updates the candidate list using the post-update score. That is, the score update unit 27 changes an order of the registered fingerprint IDs in the candidate list in a descending order of the obtained post-update score. At this time, the score update unit 27 may remove each registered fingerprint image in which the post-update score is equal to or lower than a predetermined threshold value from the candidate list. FIG. 4B illustrates an example of the candidate list after the update. As can be seen by comparing with the initial candidate list in FIG. 4A, in the example in FIG. 4B, by updating the score based on an input of the marker M by the user, the registered fingerprint having a score indicating a first place and the registered fingerprint having a score indicating a second place are interchanged. The score update unit 27 corresponds to an example of a score update means.

As described above, according to the present example embodiment, when the user inputs the marker at a characteristic or unique position by looking at the input fingerprint image, a difference value between the input fingerprint image and each of the registered fingerprint images is calculated in an area centered on the marker, each of scores for the registered fingerprint images is updated, and the candidate list is updated. For instance, when the user with knowledge and experience concerning matching of a fingerprint, such as a forensic examiner in a criminal investigation, inputs the marker, each of scores for the registered fingerprints is updated focusing on an image at a position where the marker is applied, and a ranking in the candidate list is updated. In the criminal investigation, a final matching determination of a fingerprint is made by an experienced forensic examiner, or the like; however, by improving accuracy of the candidate list by applying the marker, and reducing to top candidates in the candidate list, it becomes possible to effectively reduce the number of registered fingerprint images to be determined by a person such as the forensic examiner.

[Fingerprint Matching Process]

Figure 6:
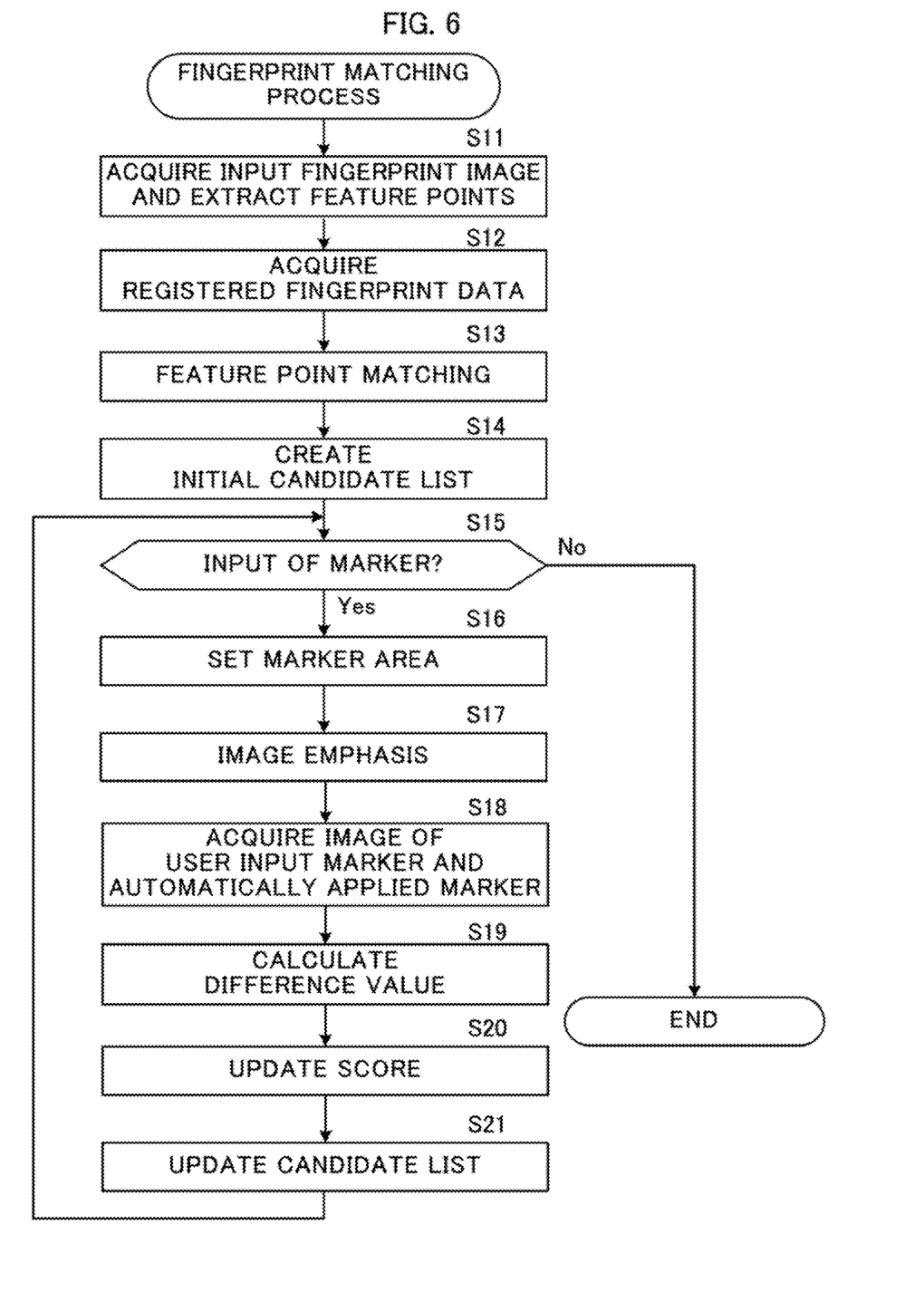
FIG. 6 is a flowchart of a fingerprint matching process.

Next, the fingerprint matching process performed by the fingerprint matching apparatus 100 will be described. FIG. 6 illustrates a flowchart of the fingerprint matching process. This process is realized by the processor 12 depicted in FIG. 2, which executes a program prepared in advance and operates as each of elements depicted in FIG. 3.

First, the feature point extraction unit 20 acquires an input fingerprint image input from an outside and extracts feature points from the input fingerprint image (step S11). Next, the feature point extraction unit 20 acquires sets of the registered fingerprint data from the fingerprint DB 3 (step S12). After that, the feature point matching unit 21 compares the feature points extracted from the input fingerprint image with the feature points included in each set of the registered fingerprint data, calculates each of scores (step S13), and creates the initial candidate list as illustrated in FIG. 4A (step S14).

Next, the fingerprint matching apparatus 100 determines whether or not a marker has been input by the user (step S15). When there is no input of the marker (step S15: No), the fingerprint matching process is terminated. On the other hand, when there is an input of the marker (step S15: Yes), the marker area setting unit 23 sets the user input marker area to the input fingerprint image, and sets the automatic correspondence marker area corresponding to the user input marker area to the registered fingerprint image (step S16).

Next, the image emphasis unit 24 performs the image emphasis with respect to the input fingerprint image and the registered fingerprint image (step S17). After that, the partial image acquisition unit 25 acquires an input fingerprint partial image corresponding to the user input marker area from the input fingerprint image after the image emphasis, and acquires a registered fingerprint partial image corresponding to the automatic correspondence marker area from the registered fingerprint image after the image emphasis (step S18). Subsequently, the partial image acquisition unit 25 calculates a difference value between the input fingerprint partial image and the registered fingerprint partial image (step S19). Note that the partial image acquisition unit 25 calculates difference values for respective registered fingerprints specified in the candidate list.

Next, the score update unit 27 re-calculates and updates the scores for the respective registered fingerprints based on the calculated difference values (step S20). Moreover, the score update unit 27 updates the candidate list as illustrated in FIG. 4B based on the scores for the respective registered fingerprints (step S21). After that, the fingerprint matching process is terminated.

Accordingly, the scores are updated each time the user inputs the marker M. The number of markers M the user inputs at a time may be one or more. In a case where the user inputs a plurality of markers one time, the fingerprint matching apparatus 100 may apply corresponding markers Mx respectively for the plurality of input markers M, and the score may be updated using a total or an average of degrees of similarity corresponding to respective pairs.

[Modification]
(Modification 1)

In the above example embodiment, when the user inputs the marker M, the marker area setting unit 23 applies a corresponding marker Mx to the registered fingerprint image, and the registered fingerprint image with the marker Mx is displayed on the display device 17; alternatively, a position of the marker Mx may be corrected by the user. For instance, the user may correct the position of the marker Mx on the registered fingerprint image using the input device 16 such as a mouse in the same manner as the user inputs the marker M on the input fingerprint image. In a case where the user corrects the position of the marker Mx, the update of the score is performed based on the position of the marker Mx after the correction.

(Modification 2)

In the above-described example embodiment, the score for each of the registered fingerprints is updated using the difference value between the input fingerprint partial image based on the marker M and the registered fingerprint partial image based on the marker Mx; however, the score for each of the registered fingerprints may be updated using an index other than the difference value indicating the degree of similarity or the degree of matching between two images.

<Second Example Embodiment>

Figure 7:
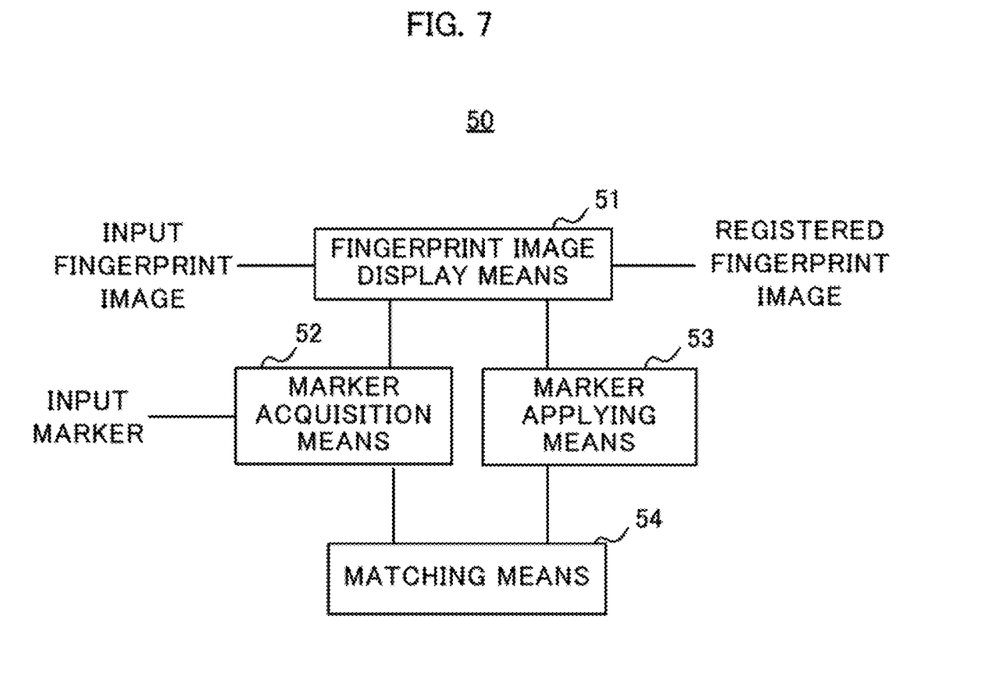
FIG. 7 is a block diagram illustrating a functional configuration of a fingerprint matching apparatus according to a second example embodiment.

FIG. 7 is a block diagram illustrating a functional configuration of a fingerprint matching apparatus 50 according to a second example embodiment. The fingerprint matching apparatus 50 includes a fingerprint image display means 51, a marker acquisition means 52, a marker applying means 53, and a matching means 54. The fingerprint image display means 51 displays an input fingerprint image being a fingerprint image which is input and a registered fingerprint image being a fingerprint image which has been registered. The marker acquisition means 52 acquires a position of an input marker, which is input by a user, with respect to the displayed input fingerprint image. The marker applying means 53 applies a correspondence marker to a position corresponding to the input marker, in the registered fingerprint image. The matching means 54 performs matching between the input fingerprint image to which the input marker is input and the registered fingerprint image to which the correspondence marker has been provided.

A part or all of the example embodiments described above may also be described as the following supplementary notes, but not limited thereto.

(Supplementary Note 1)

1. A fingerprint matching apparatus comprising:

a fingerprint image display means for displaying an input fingerprint image being a fingerprint image which is input and a registered fingerprint image being a fingerprint image which has been registered;

a marker acquisition means for acquiring a position of an input marker which is input by a user with respect to the input fingerprint image being displayed;

a marker applying means for applying a correspondence marker at a position corresponding to the input marker, in the registered fingerprint image; and a matching means for matching the input fingerprint image to which the input marker is input, with the registered fingerprint image to which the correspondence marker has been applied.

(Supplementary Note 2)

2. The fingerprint matching apparatus according to supplementary note 1, wherein the marker applying means applies the correspondence marker with respect to a plurality of registered fingerprint images to be matched with the input fingerprint image.

(Supplementary Note 3)

3. The fingerprint matching apparatus according to supplementary note 1 or 2, further comprising a feature point extraction means for extracting feature points from the input fingerprint image and acquiring feature points of the registered fingerprint image, wherein the marker applying means applies the correspondence marker so that a positional relationship between the input marker in the input fingerprint image and feature points located in a periphery of the input marker and a positional relationship between the correspondence marker in the registered fingerprint image and feature points located in a periphery of the correspondence marker become the same.

(Supplementary Note 4)

4. The fingerprint matching apparatus according to any one of supplementary notes 1 through 3, further comprising:

a matching acquiring calculating a score indicating a degree of similarity between feature points extracted from the input fingerprint image and feature points extracted from the registered fingerprint image;

a partial image acquisition means for acquiring an image at a position of the input marker in the input fingerprint image as an input fingerprint partial image, and acquiring an image at a position of the correspondence marker in the registered fingerprint image as a registered fingerprint partial image; and a score update means for updating the score using the input fingerprint partial image and the registered fingerprint partial image.

(Supplementary Note 5)

5. The fingerprint matching apparatus according to supplementary note 4, further comprising a list creation means for creating a list in which a plurality of registered fingerprint images are ordered in descending order of degrees of similarity with respect to the input fingerprint image based on scores, wherein the list creation means updates the order of the plurality of registered fingerprint images in the list based on post-update scores when the scores are updated by the score update means.

(Supplementary Note 6)

6. The fingerprint matching apparatus according to supplementary note 5, wherein the score update means calculates difference values between the input fingerprint partial image and respective registered fingerprint partial images, and updates the scores using the calculated difference values.

(Supplementary Note 7)

7. The fingerprint matching apparatus according to supplementary note 6, wherein the score update means calculates difference values of pixel values between the input fingerprint partial image and respective registered fingerprint partial images by shifting a relative position between the input fingerprint partial image and each of the registered fingerprint partial images in a vertical direction and a horizontal direction, and updates the scores using respective minimum difference values which are acquired.

(Supplementary Note 8)

8. The fingerprint matching apparatus according to any one of supplementary notes 4 through 7, wherein the partial image acquisition means acquires an image of a rectangular area with a predetermined size centered on the input marker in the input fingerprint image as input fingerprint partial image, and acquires an image of a rectangular area with the predetermined size centered on the correspondence marker in each registered fingerprint image as the registered fingerprint partial image.

(Supplementary Note 9)

9. A fingerprint matching method, comprising:

displaying an input fingerprint image being a fingerprint image which is input and a registered fingerprint image being a fingerprint image which has been registered;

acquiring a position of an input marker which is input by a user with respect to the input fingerprint image being displayed;

applying a correspondence marker at a position corresponding to the input marker, in the registered fingerprint image; and matching the input fingerprint image to which the input marker is input, with the registered fingerprint image to which the correspondence marker has been applied.

(Supplementary Note 10)

10. A recording medium storing a program, the program causing a computer to perform a process comprising:

displaying an input fingerprint image being a fingerprint image which is input and a registered fingerprint image being a fingerprint image which has been registered;

acquiring a position of an input marker which is input by a user with respect to the input fingerprint image being displayed;

applying a correspondence marker at a position corresponding to the input marker, in the registered fingerprint image; and matching the input fingerprint image to which the input marker is input, with the registered fingerprint image to which the correspondence marker has been applied.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

DESCRIPTION OF SYMBOLS

3 Fingerprint database (DB)
11 Input IF
12 Processor
13 Memory
14 Recording medium
15 Database
16 Input device
17 Display device
20 Feature point extraction unit
21 Feature point matching unit
22 Display control unit
23 Marker area setting unit
24 Image emphasis unit
25 Partial image acquisition unit
26 Difference calculation unit
27 Score update unit
50 Fingerprint matching apparatus
51 Fingerprint image display means
52 Marker acquisition means
53 Marker applying means
54 Matching means
100 Fingerprint matching apparatus
M, Mx Marker

What is claimed is:

1. A fingerprint matching apparatus comprising:
a memory storing instructions; and
one or more processors configured to execute the instructions to:
display an input fingerprint image being a fingerprint image which is input and a registered fingerprint image being a fingerprint image which has been registered;
acquire a position of an input marker which is input by a user with respect to the input fingerprint image being displayed;
apply a correspondence marker at a position corresponding to the input marker, in the registered fingerprint image; and
match the input fingerprint image to which the input marker is input, with the registered fingerprint image to which the correspondence marker has been applied.

2. The fingerprint matching apparatus according to claim 1, wherein the processor applies the correspondence marker with respect to a plurality of registered fingerprint image to be matched with the input fingerprint image.

3. The fingerprint matching apparatus according to claim 1, wherein the processor is further configured to extract feature points from the input fingerprint image and acquire feature points of the registered fingerprint image, wherein the processor applies the correspondence marker so that a positional relationship between the input marker in the input fingerprint image and feature points located in a periphery of the input marker and a positional relationship between the correspondence marker in the registered fingerprint image and feature points located in a periphery of the correspondence marker become the same.

4. The fingerprint matching apparatus according to claim 1, wherein the processor is further configured to
calculate a score indicating a degree of similarity between feature points extracted from the input fingerprint image and feature points extracted from the registered fingerprint image;
acquire an image at a position of the input marker in the input fingerprint image as an input fingerprint partial image, and acquire an image at a position of the correspondence marker in the registered fingerprint image as a registered fingerprint partial image; and
update the score using the input fingerprint partial image and the registered fingerprint partial image.

5. The fingerprint matching apparatus according to claim 4, wherein the processor is further configured to create a list in which a plurality of registered fingerprint images are ordered in descending order of degrees of similarity with respect to the input fingerprint image based on scores,
wherein the processor updates the order of the plurality of registered fingerprint images in the list based on post-update scores when the scores are updated.

6. The fingerprint matching apparatus according to claim 5, wherein the processor calculates difference values between the input fingerprint partial image and respective registered fingerprint partial images, and updates the scores using the calculated difference values.

7. The fingerprint matching apparatus according to claim 6, wherein the processor calculates difference values of pixel values between the input fingerprint partial image and respective registered fingerprint partial images by shifting a relative position between the input fingerprint partial image and each of the registered fingerprint partial images in a vertical direction and a horizontal direction, and updates the scores using respective minimum difference values which are acquired.

8. The fingerprint matching apparatus according to claim 4, wherein the processor acquires an image of a rectangular area with a predetermined size centered on the input marker in the input fingerprint image as input fingerprint partial image, and acquires an image of a rectangular area with the predetermined size centered on the correspondence marker in each registered fingerprint image as the registered fingerprint partial image.

9. A fingerprint matching method, comprising:
displaying an input fingerprint image being a fingerprint image which is input and a registered fingerprint image being a fingerprint image which has been registered;
acquiring a position of an input marker which is input by a user with respect to the input fingerprint image being displayed;
applying a correspondence marker at a position corresponding to the input marker, in the registered fingerprint image; and
matching the input fingerprint image to which the input marker is input, with the registered fingerprint image to which the correspondence marker has been applied.

10. A non-transitory computer-readable recording medium storing a program, the program causing a computer to perform a process comprising:
displaying an input fingerprint image being a fingerprint image which is input and a registered fingerprint image being a fingerprint image which has been registered;
acquiring a position of an input marker which is input by a user with respect to the input fingerprint image being displayed;
applying a correspondence marker at a position corresponding to the input marker, in the registered fingerprint image; and
matching the input fingerprint image to which the input marker is input, with the registered fingerprint image to which the correspondence marker has been applied.

* * * * *